(12) United States Patent
Lalgudi et al.

(10) Patent No.: US 11,266,865 B2
(45) Date of Patent: Mar. 8, 2022

(54) DECONTAMINATION COMPOSITIONS AND METHODS OF DECONTAMINATION

(71) Applicant: Battelle Memorial Institute, Columbus, OH (US)

(72) Inventors: Ramanathan S. Lalgudi, Columbus, OH (US); Richard Harris, Dayton, OH (US); Nathan Philip Gano, Bexley, OH (US); Erik W. Edwards, Gahanna, OH (US)

(73) Assignee: Battelle Memorial Institute, Columbus, OH (US)

( * ) Notice: Subject to any disclaimer, the term of this patent is extended or adjusted under 35 U.S.C. 154(b) by 1072 days.

(21) Appl. No.: 15/832,452

(22) Filed: Dec. 5, 2017

(65) Prior Publication Data

US 2019/0168050 A1 Jun. 6, 2019

(51) Int. Cl.
| | |
|---|---|
| A62D 3/36 | (2007.01) |
| A62D 3/38 | (2007.01) |
| C11D 11/00 | (2006.01) |
| C11D 3/12 | (2006.01) |
| C11D 3/04 | (2006.01) |
| C01F 17/235 | (2020.01) |
| A62D 101/08 | (2007.01) |
| A62D 101/20 | (2007.01) |
| C11D 1/62 | (2006.01) |
| C11D 1/12 | (2006.01) |
| C11D 1/14 | (2006.01) |
| C11D 1/48 | (2006.01) |
| C11D 1/10 | (2006.01) |

(52) U.S. Cl.
CPC .............. *A62D 3/36* (2013.01); *A62D 3/38* (2013.01); *C01F 17/235* (2020.01); *C11D 3/046* (2013.01); *C11D 3/1213* (2013.01); *C11D 11/0017* (2013.01); *A62D 2101/08* (2013.01); *A62D 2101/20* (2013.01); *C11D 1/10* (2013.01); *C11D 1/12* (2013.01); *C11D 1/143* (2013.01); *C11D 1/146* (2013.01); *C11D 1/48* (2013.01); *C11D 1/62* (2013.01)

(58) Field of Classification Search
CPC .. A62D 3/38; A62D 2101/08; A62D 2101/20; A62D 3/36; C01F 17/0043; C11D 1/10; C11D 1/12; C11D 1/143; C11D 1/146; C11D 1/48; C11D 1/62
USPC ......................................................... 588/318
See application file for complete search history.

(56) References Cited

U.S. PATENT DOCUMENTS

| | | | |
|---|---|---|---|
| 6,083,896 A | 7/2000 | Inbe et al. | |
| 7,879,935 B2 | 2/2011 | Lalgudi | |
| 8,129,069 B2 | 3/2012 | Lalgudi | |
| 8,883,935 B2 | 11/2014 | Lalgudi | |
| 9,000,203 B2 | 4/2015 | Lalgudi | |
| 2011/0079560 A1 | 4/2011 | Maugans et al. | |
| 2014/0073551 A1 | 3/2014 | Mort, III et al. | |
| 2016/0057993 A1* | 3/2016 | Ludwig | C11D 3/10 424/718 |

FOREIGN PATENT DOCUMENTS

| | | |
|---|---|---|
| CN | 104640966 A | 5/2015 |
| CN | 104709997 A | 6/2015 |
| CN | 105200662 | 12/2015 |
| DE | 202006005910 U1 | 6/2006 |
| EP | 0898985 A1 | 3/1999 |
| JP | 2000119956 | 4/2000 |
| JP | 2000328439 | 11/2000 |
| KR | 20160011595 | 2/2016 |
| WO | 9946010 | 9/1999 |
| WO | 2007141781 A2 | 12/2007 |
| WO | 2016135344 A1 | 9/2016 |
| WO | 2017214304 A1 | 12/2017 |

OTHER PUBLICATIONS

US Environmental Protection Agency, Toxilogical Review of Cerium Oxide and Cerium Compounds In Support of Summary Information on the Integrated Risk Information System (IRIS), Sep. 2009.
Masahiro Asano, et al., Decomposition of Benzo (a) Pyrene on Artificial Sea Water Using of UV/Photocatalytic Oxidation Process, 13th World Lake Conference, Nov. 1-5, 2009, Wuhan, Hubei Province, China.
Homem, Vera, et al., Preliminary Feasibility Study of Benzo(a)Pyrene Oxidative Degradation by Fenton Treatment, Hindawi Publishing Corporation, Journal of Environmental and Public Health, vol. 2009, Article 1D 149034.
Strunk, Jennifer, et al., Synthesis of Different CeO2 Structures on Mesoporous Silica and Characterization of Their Reduction Properties, The Journal of Physical Chemistry, 115, 4114-4126, California, 2011.
Ferrandon, Magali, Mixed Metal Oxide—Noble Metal Catalysts for Total Oxidation of Volatile Organic Compounds and Carbon Monoxide, Department of Chemical Engineering and Technology, Chemical Reaction Engineering, Stockholm, 2001.
Zhang, Xuebin, et al., Room-Temperature Catalytic Oxidation of Benzo(a)pyrene by Ce-SBA-15 Supported Active CeSiO4 Phase, Applied Catalysis B: Enviromental 127 (2012) 105-111.

(Continued)

*Primary Examiner* — Edward M Johnson
(74) *Attorney, Agent, or Firm* — Greer, Burns & Crain, Ltd.

(57) ABSTRACT

Decontamination compositions useful to decontaminate potentially toxic materials, such as PAH and others, present on clothing comprise an aqueous solution of a water soluble cerium salt or a dispersion of cerium oxide in water. The decontamination composition may optionally include at least one of an oxidizer, a surfactant, a co-solvent, a chelating agent, and a polymer. Methods of decontaminating clothing involve applying the decontamination composition to the clothing.

19 Claims, No Drawings

(56) References Cited

OTHER PUBLICATIONS

Fent, Kenneth W., et al., Contamination of firefighter personal protective equipment and skin and the effectiveness of decontamination procedures, Journal of Occupational and Environmental Hygiene, (2017) 14:10, 801-814, DOI: 10.1080/15459624.2017.1334904.
International Search Report and Written Opinion dated Aug. 20, 2018 for corresponding PCT application.
Yixing, Zhan, Production method of chemical small commodities (vol. 10), Mar. 1992, Science and Technology Press, p. 501. ISBN 7-5357-0984-2.
Falbe, J., Surfactants in Consumer Products, 1994, Petrochemical Press, p. 115. ISBN 7-80043-513-X.
Airuo, Liu, Practical Chemistry, Sep. 1998, Normal University Press, p. 21. ISBN 7-5613-1901-O/O 59.
Jihua, Jia, Comprehensive experiment of chemical engineering and technology, Sep. 2009, p. 137. ISBN 978-7-81133-542-2.
Hongfa, Zhu, Catalyst Manual, Aug. 2008, Jindun Press, pp. 473-474. ISBN 978-7-5082-5148-6.

\* cited by examiner

DECONTAMINATION COMPOSITIONS AND METHODS OF DECONTAMINATION

Consumers, first responders, and military personnel are often exposed to potentially undesirable materials, including, but not limited to, phthalate plasticizers, formaldehyde, halogenated flame retardants, polycyclic aromatic hydrocarbons (PAH), and chemical and biological warfare agents. Examples of PAH include, but are not limited to, benzo(a) pyrene, benzo(e)pyrene, benz(a)anthracene, benzo(k)fluoranthene, fluorene, anthracene, and fluoranthene. These are compounds with two or more fused aromatic rings, containing only carbon and hydrogen. They are potentially endocrine disrupting as well as potentially tumorigenic substances. Benzo(a)pyrene (BaP) is a concerning PAH.

PAH present in the soil is typically decontaminated using chemicals, microbes, and other physical methods, such as adsorption, thermal, ultra-violet, ultrasonic and plasma radiations. PAH emitted from automotive fuel exhaust can be decontaminated using catalytic oxidation.

When firefighters are exposed to fires, PAHs can be deposited on the surface of their personal protective clothing. Protective clothing can include, for example, turnout clothing, fire proximity suits and hazmat suits, which are worn by firefighters and first responders. A firefighter's turnout clothing usually includes a combination of a uniform shirt, uniform trousers, a jacket, trousers, gloves, boots, hoods, and helmets. Protective clothing may also be worn by personnel in law enforcement, the military, cleaning or repair services, and the construction industry.

There is a need to remove these compounds safely from the personal protective clothing. Currently, the PAHs are removed by washing. However, while this works, it can also expose other clothing to the PAHs, which is undesirable.

Decontamination compositions specifically used to decontaminate PAH that have reported in the literature only remove the contaminant partially from the surface, and they are not effective in converting them to less toxic or benign materials at room temperature within a brief period time.

Recently, it was reported that using scrubbing and power washing of firefighters ensemble with soap water removes up to 60% of the PAH's. (Reference: Fent et al., Contamination of firefighter personal protective equipment and skin and the effectiveness of decontamination procedures. J. Occup. Environ. Hyg. 2017, 14, p. 801-814.)

However, there remains a need to remove and/or reduce potentially toxic material, such as the PAHs, from clothing before laundering to reduce or eliminate further exposure to the PAHs.

DETAILED DESCRIPTION

The present invention relates generally to decontaminating clothing having toxic materials thereon. More particularly, it relates to decontaminating compositions and methods useful to decontaminate potentially toxic materials, such as PAH and others, present on clothing. Examples of clothing which can be decontaminated using the decontaminating composition and method include, but are not limited to, turnout clothing, fire proximity suits and hazmat suits, which are worn by firefighters and first responders. A firefighter's turnout clothing usually includes a combination of a uniform shirt, uniform trousers, a jacket, trousers, gloves, boots, hoods, and helmets. In addition, the normal clothing of a person who was exposed to toxic materials, PAH, or both could also decontaminated using the decontamination composition.

For effective decontamination of toxic materials, PAH, or both, it is desirable that the decontamination composition removes the toxic materials, PAH, or both from the surface and/or converts them to corresponding reaction products (e.g., oxidized products) which are typically less toxic or benign materials. It is also desirable that the decontamination be effective at temperatures in the range of 4° C. to 30° C. within a brief period of time, e.g., preferably within one hour.

One aspect of the invention is a decontamination composition. In one embodiment, the decontamination composition comprises an aqueous solution of a water soluble cerium salt or a dispersion of cerium oxide in water. The composition may have a cerium salt concentration ranging from 0.01 and 80 wt % of the decontamination composition (based on total composition), or from 0.01 and 70 wt %, or from 0.01 and 60 wt %, or from 0.01 and 50 wt %, or from 0.01 and 40 wt %, or from 0.01 and 30 wt %, or from 0.01 and 20 wt %, or from 0.01 and 10 wt %, or from 0.01 and 5 wt %, or from 1 and 80 wt %, or from 1 and 70 wt %, or from 1 and 60 wt %, or from 1 and 50 wt %, or from 1 and 40 wt %, or from 1 and 30 wt %, or from 1 and 20 wt %, or from 1 and 10 wt %, or from 1 and 5 wt %, or from 4 and 80 wt %, or from 4 and 70 wt %, or from 4 and 60 wt %, or from 4 and 50 wt %, or from 4 and 40 wt %, or from 4 and 30 wt %, or from 4 and 20 wt %, or from 4 and 10 wt %, or from 10 and 80 wt %, or from 10 and 70 wt %, or from 10 and 60 wt %, or from 10 and 50 wt %, or from 10 and 40 wt %, or from 10 and 30 wt %, or from 10 and 20 wt %, or from 20 and 80 wt %, or from 20 and 70 wt %, or from 20 and 60 wt %, or from 20 and 50 wt %, or from 20 and 40 wt %, or from 20 and 30 wt %, or from 25 and 80 wt %, or from 25 and 70 wt %, or from 25 and 60 wt %, or from 25 and 50 wt %, or from 25 and 40 wt %, or from 25 and 35 wt %. Suitable water soluble cerium salts include, but are not limited to, ammonium cerium (IV) nitrate, ammonium cerium(IV) sulfate hydrate, cerium(III) carbonate hydrate, cerium(III) chloride heptahydrate, cerium(IV) fluoride, cerium(IV) hydroxide, cerium(IV) nitrate hexahydrate, cerium (III) sulfate hydrate, or combinations thereof.

The cerium oxide concentration in the dispersion is generally 1 to 50 wt % of the decontamination composition (based on total composition), or 1 to 45 wt %, or 1 to 40 wt %, or 1 to 35 wt %, or 1 to 30 wt %, or 1 to 35 wt %, or 1 to 20 wt %, or 1 to 15 wt %, or 1 to 10 wt %, or 1 to 5 wt %, or 5 to 50 wt %, or 10 to 50 wt %, or 15 to 50 wt %, or 20 to 50 wt %, or 25 to 50 wt %, or 30 to 50 wt %, or 35 to 50 wt %, or 40 to 50 wt %, or 45 to 50 wt %.

The cerium ion concentration in the decontamination composition is typically in the range of 1 to 500 parts per million (ppm), or 10 to 500 ppm, or 20 to 500 ppm, or 30 to 500 ppm, or 40 to 500 ppm, or 50 to 500 ppm, or 60 to 500 ppm, or 70 to 500 ppm, or 80 to 500 ppm, or 90 to 500 ppm, or 100 to 500 ppm, or 125 to 500 ppm, or 150 to 500 ppm, or 175 to 500 ppm, or 200 to 500 ppm, or 225 to 500 ppm, or 250 to 500 ppm, or 275 to 500 ppm, or 300 to 500 ppm, or 325 to 500 ppm, or 350 to 500 ppm, or 375 to 500 ppm, or 400 to 500 ppm, or 425 to 500 ppm, or 450 to 500 ppm, or 475 to 500 ppm, or 1 to 475 ppm, or 1 to 450 ppm, or 1 to 425 ppm, or 1 to 400 ppm, or 1 to 375 ppm, or 1 to 350 ppm, or 1 to 325 ppm, or 1 to 300 ppm, or 1 to 275 ppm, or 1 to 250 ppm, or 1 to 225 ppm, or 1 to 200 ppm, or 1 to 175 ppm, or 1 to 150 ppm, or 1 to 125 ppm, or 1 to 100 ppm, or 1 to 75 ppm, or 1 to 50 ppm, or 1 to 25 ppm, or 1 to 10 ppm.

The water used in the solution can be any type of water, including but not limited to, distilled water, deionized water, tap water, and the like. The water is generally present in the decontamination composition in amount ranging from 30 to 99 wt %, or 35 to 99 wt %, or 40 to 99 wt %, or 45 to 99 wt %, or 50 to 99 wt %, or 55 to 99 wt %, or 60 to 99 wt %, or 65 to 99 wt %, or 70 to 99 wt %, or 75 to 99 wt %, or 80 to 99 wt %, or 85 to 99 wt %, or 90 to 99 wt %, or 95 to 99 wt %, or 30 to 95 wt %, or 30 to 90 wt %, or 30 to 85 wt %, or 30 to 80 wt %, or 30 to 75 wt %, or 30 to 70 wt %, or 30 to 65 wt %, or 30 to 60 wt %, or 30 to 55 wt %, or 30 to 50 wt %, or 30 to 45 wt %, or 30 to 40 wt %, or 40 to 95 wt %, or 40 to 90 wt %, or 40 to 85 wt %, or 40 to 80 wt %, or 40 to 75 wt %, or 40 to 70 wt %, or 40 to 65 wt %, or 40 to 60 wt %, or 40 to 55 wt %, or 40 to 50 wt %, or 40 to 45 wt %.

The decontamination composition may optionally include at least one of an oxidizer, an activator for the oxidizer, a surfactant, a co-solvent, a chelating agent, and a polymer. When any of these components are present, there can be one or more of that component (i.e., one or more oxidizers, one or more surfactants, one or more co-solvents, one or more chelating agents, and/or one or more polymers).

The oxidizer may oxidize and decontaminate phthalate plasticizers, formaldehyde, halogenated flame retardants, polycyclic aromatic hydrocarbons (PAH), and chemical and biological warfare agents. Any suitable oxidizer may be used, including, but not limited to, hydrogen peroxide, sodium hypochlorite, sodium percarbonate, or combinations thereof. The oxidizer may comprise 1 to 10 wt % of the decontamination composition (based on the total composition), or 2 to 10 wt %, or 3 to 10 wt %, or 4 to 10 wt %, or 5 to 10 wt %, or 6 to 10 wt %, or 7 to 10 wt %, or 8 to 10 wt %, or 9 to 10 wt %, or 1 to 9 wt %, or 1 to 8 wt %, or 1 to 7 wt %, or 1 to 6 wt %, or 1 to 5 wt %, or 1 to 4 wt %, or 1 to 3 wt %, or 1 to 2 wt %.

The activator for the oxidizer activates the oxidizer so that the oxygen release takes place at lower temperature. For example, if hydrogen peroxide is used as an oxidizer to clean the surface, typically the effectiveness of cleaning is seen above 45° C. However, if an activator is used with the hydrogen peroxide, effective cleaning can take place at temperatures below 25° C. Suitable activators include, but are not limited to, tetraacetoxy ethylene diamine (TAED), sodium nonanoyloxybenzenesulfonate, silver acetate, silver nitrate, manganese acetate, copper acetate, iron (II) sulfate, iron (III) sulfate, or combinations thereof. The activator may comprise 0.01 to 10 wt % of the decontamination composition (based on the total composition), or 0.01 to 8 wt %, or 0.01 to 6 wt %, 0.01 to 5 wt %, 0.01 to 4 wt %, or 0.01 to 3 wt %, 0.01 to 2 wt %, or 0.01 to 1 wt %, or 0.01 to 0.8 wt %, or 0.01 to 0.6 wt %, or 0.01 to 0.5 wt %, or 0.01 to 0.4 wt %, or 0.01 to 0.3 wt %, or 0.01 to 0.2 wt %, or 0.01 to 0.1 wt %, or 0.01 to 0.08 wt %, 0.01 to 0.06 wt %, or 0.01 to 0.05 wt %.

The surfactant may be useful to spread the decontamination composition evenly on the contaminated surface. Any suitable surfactant may be used. The surfactant can be a cationic surfactant, an anionic surfactant, a non-ionic surfactant, or combinations thereof. Examples of non-ionic surfactants include, but are not limited to, poly(ethylene oxide-b-propylene oxide), poly(ethylene oxide-b-butylene oxide), sorbitol esters of fatty acids, ethoxylated fatty alcohols, and combinations thereof. Examples of anionic surfactants include, but are not limited to, sodium dodecyl sulfate, sodium lauryl benzene sulfonate, poly acrylic acid, sulfate based surfactants, and sulfonate based surfactants, and combinations thereof. Examples of cationic surfactants include, but are not limited to, benzalkonium salts, polyquaterniriums, and poly(vinyl pyridine) co-N,N dimethyl ethyl methacrylate, or combinations thereof. Polyquaternium is a designation used to emphasize the presence of quaternary ammonium centers in the polymer. The numbers are assigned in the order in which they are registered rather than because of their chemical structure. Examples of polyquaterniums include, but are not limited to, polyquaternium-5 which is a copolymer of acrylamide and quaternized dimethylammoniumethyl methacrylate, polyquaternium-7 which is copolymer of acrylamide and diallyldimethylammonium chloride, and polyquaternium-7 which is terpolymer of acrylic acid, methacrylamidopropyl trimethylammonium chloride, and methyl acrylate. Some commercial examples of surfactants are: ALGENE®, EMPIGEN® B series, BTC Onixide, and Quaterx 192. The surfactant may comprise 0.5 to 2 wt % of the decontamination composition (based on the total composition), or 0.5 to 1.5 wt %, or 0.5 to 1 wt %, or 0.5 to 0.9 wt %, or 0.5 to 0.8 wt %, or 0.5 to 0.7 wt %, or 0.5 to 0.6 wt %, or 0.6 to 2 wt %, or 0.7 to 2 wt %, or 0.8 to 2 wt %, or 0.9 to 2 wt %, or 1.0 to 2 wt %, or 1.1 to 2 wt %, or 1.3 to 2 wt %, or 1.4 to 2 wt %, or 1.5 to 2 wt %, or 1.6 to 2 wt %, or 1.7 to 2 wt %, or 1.8 to 2 wt %, or 1.9 to 2 wt %.

The co-solvent can help to keep the desired solubility of the decontamination composition. Any suitable co-solvents can be used, including but not limited to, ethanol, glycerol, propylene glycol, propylene glycol ethyl ether, ethylene carbonate, propylene carbonate, or combinations thereof. The co-solvent may comprise 10 to 30 wt % of the decontamination composition (based on the total composition), or 10 to 25 wt %, or 10 to 20 wt %, or 10 to 15 wt %, or 15 to 30 wt %, or 20 to 30 wt %, or 35 to 30 wt %.

The chelating agent can prevent the interference of minerals such as sodium, potassium, magnesium with cerium during the decontamination reactions. Any suitable chelating additives can be used including, but not limited to, citric acid, ethylene diamine tetraacetic acid, or combinations thereof. The chelating agent may comprise 0.2 to 1 wt % of the decontamination composition (based on the total composition), or 0.2 to 0.9 wt %, or 0.2 to 0.8 wt %, or 0.2 to 0.7 wt %, or 0.2 to 0.6 wt %, or 0.2 to 0.5 wt %, or 0.2 to 0.4 wt %, or 0.2 to 0.3 wt %, or 0.3 to 1 wt %, or 0.4 to 1 wt %, or 0.5 to 1 wt %, or 0.6 to 1 wt %, or 0.7 to 1 wt %, or 0.8 to 1 wt %, or 0.9 to 1 wt %.

The polymer can help achieve desirable flow, viscosity, or both of the decontamination composition during application. Any suitable polymer, can be used including, but not limited to, polyacrylic acids, a poly (acrylic acid-co-methyl vinyl ether), polyvinyl pyrrolidones, polyvinyl pyridines, polyoxazolidone and polyoxazolidone copolymers, or combinations thereof. The polymer may comprise 0.1 to 5 wt % of the decontamination composition (based on the total composition), or 0.1 to 4.5 wt %, or 0.1 to 4 wt %, or 0.1 to 3.5 wt %, or 0.1 to 3 wt %, or 0.1 to 2.5 wt %, or 0.1 to 2 wt %, or 0.1 to 1.5 wt %, or 0.1 to 1 wt %, or 0.1 to 0.5 wt %, or 0.5 to 5 wt %, or 1 to 5 wt %, or 1.5 to 5 wt %, or 2 to 5 wt %, or 2.5 to 5 wt %, or 3 to 5 wt %, or 3.5 to 5 wt %, or 4 to 5 wt %, or 4.5 to 5 wt %.

In some embodiments, the cerium salt can be reacted with hydroxides to form a dispersion of cerium oxide in water. However, this is less desirable because cerium oxide is more expensive than cerium salts. Suitable hydroxides include, but are not limited to tetramethylammonium hydroxide (TMAH), ammonium hydroxide, choline hydroxide, benzyltrimethylammonium hydroxide, or combinations thereof.

In some embodiments, the decontamination composition comprises an aqueous solution comprising 1 to 500 ppm cerium ions.

In some embodiments, the decontamination composition comprises an aqueous solution comprising 1-250 ppm cerium ions.

In some embodiments, the decontamination composition comprises an aqueous solution comprising 1-100 ppm cerium ions.

In some embodiments, the decontamination composition comprises an aqueous solution comprising 1 to 500 ppm cerium ions, 0 to 10 wt % oxidizer, 0 to 10 wt % activator, 0 to 2 wt % surfactant, 0 to 30 wt % co-solvent, 0 to 1 wt % chelating agent, and 0 to 5 wt % polymer and wherein the amount of at least one of the oxidizer, the activator, the surfactant, the co-solvent, the chelating agent, or the polymer is greater than 0.

In some embodiments, the decontamination composition comprises an aqueous solution comprising 1 to 250 ppm cerium ions, 0 to 10 wt % oxidizer, 0 to 10 wt % activator, 0 to 2 wt % surfactant, 0 to 30 wt % co-solvent, 0 to 1 wt % chelating agent, and 0 to 5 wt % polymer and wherein the amount of at least one of the oxidizer, the activator, the surfactant, the co-solvent, the chelating agent, or the polymer is greater than 0.

In some embodiments, the decontamination composition comprises an aqueous solution comprising 1 to 500 ppm cerium ions, 0 to 10 wt % oxidizer, 0 to 10 wt % activator, 0 to 2 wt % surfactant, 0 to 30 wt % co-solvent, 0 to 1 wt % chelating agent, and 0 to 5 wt % polymer, and wherein the amount of at least one of the oxidizer, the activator, the surfactant, the co-solvent, the chelating agent, or the polymer is greater than 0.

In some embodiments, the decontamination composition comprises an aqueous solution comprising 1 to 500 ppm cerium ions, 0 to 10 wt % oxidizer, 0 to 10 wt % activator, 0 to 2 wt % surfactant, 0 to 30 wt % co-solvent, 0 to 1 wt % chelating agent, and 0 to 5 wt % polymer and wherein the amount of at least two of the oxidizer, the activator, the surfactant, the co-solvent, the chelating agent, or the polymer is greater than 0.

In some embodiments, the decontamination composition comprises an aqueous solution comprising 1 to 250 ppm cerium ions, 0 to 10 wt % oxidizer, 0 to 10 wt % activator, 0 to 2 wt % surfactant, 0 to 30 wt % co-solvent, 0 to 1 wt % chelating agent, and 0 to 5 wt % polymer and wherein the amount of at least two of the oxidizer, the activator, the surfactant, the co-solvent, the chelating agent, or the polymer is greater than 0.

In some embodiments, the decontamination composition comprises an aqueous solution comprising 1 to 100 ppm cerium ions, 0 to 10 wt % oxidizer, 0 to 10 wt % activator, 0 to 2 wt % surfactant, 0 to 30 wt % co-solvent, 0 to 1 wt % chelating agent, and 0 to 5 wt % polymer, and wherein the amount of at least two of the oxidizer, the activator, the surfactant, the co-solvent, the chelating agent, or the polymer is greater than 0.

In some embodiments, the decontamination composition comprises an aqueous solution comprising 1 to 500 ppm cerium ions, 0 to 10 wt % oxidizer, 0 to 10 wt % activator, 0 to 2 wt % surfactant, 0 to 30 wt % co-solvent, 0 to 1 wt % chelating agent, and 0 to 5 wt % polymer and wherein the amount of at least three of the oxidizer, the activator, the surfactant, the co-solvent, the chelating agent, or the polymer is greater than 0.

In some embodiments, the decontamination composition comprises an aqueous solution comprising 1 to 250 ppm cerium ions, 0 to 10 wt % oxidizer, 0 to 10 wt % activator, 0 to 2 wt % surfactant, 0 to 30 wt % co-solvent, 0 to 1 wt % chelating agent, and 0 to 5 wt % polymer and wherein the amount of at least three of the oxidizer, the activator, the surfactant, the co-solvent, the chelating agent, or the polymer is greater than 0.

In some embodiments, the decontamination composition comprises an aqueous solution comprising 1 to 100 ppm cerium ions, 0 to 10 wt % oxidizer, 0 to 10 wt % activator, 0 to 2 wt % surfactant, 0 to 30 wt % co-solvent, 0 to 1 wt % chelating agent, and 0 to 5 wt % polymer, and wherein the amount of at least three of the oxidizer, the activator, the surfactant, the co-solvent, the chelating agent, or the polymer is greater than 0.

In some embodiments, the decontamination composition comprises an aqueous solution comprising 1 to 500 ppm cerium ions, 0 to 10 wt % oxidizer, 0 to 10 wt % activator, 0 to 2 wt % surfactant, 0 to 30 wt % co-solvent, 0 to 1 wt % chelating agent, and 0 to 5 wt % polymer and wherein the amount of at least four of the oxidizer, the activator, the surfactant, the co-solvent, the chelating agent, or the polymer is greater than 0.

In some embodiments, the decontamination composition comprises an aqueous solution comprising 1 to 250 ppm cerium ions, 0 to 10 wt % oxidizer, 0 to 10 wt % activator, 0 to 2 wt % surfactant, 0 to 30 wt % co-solvent, 0 to 1 wt % chelating agent, and 0 to 5 wt % polymer and wherein the amount of at least four of the oxidizer, the activator, the surfactant, the co-solvent, the chelating agent, or the polymer is greater than 0.

In some embodiments, the decontamination composition comprises an aqueous solution comprising 1 to 100 ppm cerium ions, 0 to 10 wt % oxidizer, 0 to 10 wt % activator, 0 to 2 wt % surfactant, 0 to 30 wt % co-solvent, 0 to 1 wt % chelating agent, and 0 to 5 wt % polymer, and wherein the amount of at least four of the oxidizer, the activator, the surfactant, the co-solvent, the chelating agent, or the polymer is greater than 0.

In some embodiments, the decontamination composition comprises an aqueous solution comprising 1 to 500 ppm cerium ions, 1 to 10 wt % oxidizer, 0 to 10 wt % activator, 0.5 to 2 wt % surfactant, 10 to 30 wt % co-solvent, 0.2 to 1 wt % chelating agent, and 0.1 to 5 wt % polymer.

In some embodiments, the decontamination composition comprises an aqueous solution comprising 1 to 250 ppm cerium ions, 1 to 10 wt % oxidizer, 0 to 10 wt % activator, 0.5 to 2 wt % surfactant, 10 to 30 wt % co-solvent, 0.2 to 1 wt % chelating agent, and 0.1 to 5 wt % polymer.

In some embodiments, the decontamination composition comprises an aqueous solution comprising 1 to 100 ppm cerium salt, 1 to 10 wt % oxidizer, 0 to 10 wt % activator, 0.5 to 2 wt % surfactant, 10 to 30 wt % co-solvent, 0.2 to 1 wt % chelating agent, and 0.1 to 5 wt % polymer.

In an embodiment, the decontamination compositions decontaminate the toxic materials and/or PAHs by removing at least a portion of the contaminant from the surface of the clothing. In some embodiments, the decontamination composition converts the toxic materials and/or PAHs to their corresponding oxidized products which are typically less toxic or benign materials. In some embodiments, at least some of the toxic materials and/or PAHs are removed and converted to less toxic or benign materials. Typically, at least 50% of the toxic materials and/or PAHs are removed or converted, or at least 60%, or at least 70%, or at least 80%, or at least 90%.

Another aspect of the invention involves methods of decontaminating clothing having toxic materials and/or PAH on it. In one embodiment, the method involves applying a decontamination composition to clothing containing toxic materials and/or PAH. The decontamination composition comprises an aqueous solution of a water soluble cerium salt or dispersion of cerium oxide in water as described above.

The decontamination composition can be applied using any suitable method including, but not limited to, spraying, dipping, pouring, wiping scrubbing, and combinations thereof. The decontamination composition can be removed from the clothing after decontamination by the same methods.

The aqueous solution of the water soluble cerium salt or the dispersion of cerium oxide in water may be prepared in advance of use or it may be prepared at the time it is to be applied.

In some embodiments, the decontamination composition should be maintained at a temperature in the range of 4° C. to 30° C. for storage and application, or 10° C. to 30° C., or 15° C. to 30° C., or 20° C. to 30° C., or 22° C. to 30° C.

In some embodiments, the toxic materials, PAH, or both are removed and/or converted to less toxic or benign materials within 24 hours, or within 12 hours, or within 6 hours, or within 4 hours, or within 2 hours, or within 1 hour.

In some embodiments, the decontamination composition is used to decontaminate the toxic materials and/or PAHs immediately from the firefighter's protective clothing the scene of a fire incident. In other embodiments, the decontamination composition is used to decontaminate the toxic materials and/or PAHs from the firefighter's protective clothing after the firefighter returns from the scene of a fire incident.

Another aspect of the invention is a kit containing the components for the decontamination composition. The cerium salt, cerium oxide (or cerium salt and hydroxide) could be provided in the appropriate amounts, along with one or more of the optional oxidizer, activator, surfactant, co-solvent, chelating agent, and polymer, as desired. The kit can be easily stored and transported to a site where it is needed where the components can be mixed with water and applied. The kit could designed to provide include sufficient cerium salt or cerium oxide for a single application, for example for a single fire fighter, or multiple applications, for example two or more fire fighters. Instructions can be included in the kit to provide directions for the proper mixing and application procedures.

EXAMPLES

The invention is further described with the following examples and should not be construed as to limit the scope of the invention. All examples were conducted at room temperature (approximately 23° C.).

Example 1

Preparation of Decontamination Composition A

Ammonium cerium (IV) nitrate, 40 grams (g) (Sigma #C3654) was dissolved in 100 grams of distilled water. Once the solid was dissolved, a sonicating horn (Sonicator=Misonix Sonicator 3000, horn=Misonix Inc. Model #4, ~¼-½") was placed into the cerium solution. The solution was sonicated, followed by the addition of 24 milliliters (mL) of tetramethylammonium hydroxide (TMAH, 25% in water, Sigma #331635). Once all TMAH had been charged, the solution was sonicated for another 8-10 minutes to produce the decontamination composition A.

Example 1a

Preparation of Decontamination Composition 1A 4 grams of ammonium cerium (IV) nitrate and 100 mL of distilled water were weighed in a 250 mL glass jar. The solids were dissolved using a magnetic stirrer to produce the decontamination composition 1A Example 2

Preparation of Decontamination Composition B

In a 250 mL glass jar, mix 4 grams of ammonium cerium(IV) sulfate hydrate and 100 mL of distilled water. The solids are dissolved using a magnetic stirrer to produce the decontamination composition B.

Example 3

Preparation of Decontamination Composition C

In a 250 mL glass jar, mix 4 grams of cerium(III) carbonate hydrate and 100 mL of distilled water. The solids are mixed using a magnetic stirrer to produce the decontamination composition C.

Example 4

Preparation of Decontamination Composition D

In a 250 mL glass jar, mix 4 grams of cerium(III) chloride heptahydrate and 100 mL of distilled water. The solids are mixed using a magnetic stirrer to produce the decontamination composition D.

Example 5

Preparation of Decontamination Composition E

In a 250 mL glass jar, mix 4 grams of cerium(IV) fluoride and 100 mL of distilled water. The solids are mixed using a magnetic stirrer to produce the decontamination composition E.

Example 6

Preparation of Decontamination Composition F

In a 250 mL glass jar, mix 4 grams of cerium(IV) hydroxide and 100 mL of distilled water. The solids are mixed using a magnetic stirrer to produce the decontamination composition F.

Example 7

Preparation of Decontamination Composition G

In a 250 mL glass jar, mix 4 grams of cerium(III) nitrate hexahydrate and 100 mL of distilled water. The solids are mixed using a magnetic stirrer to produce the decontamination composition G.

Example 8

Preparation of Decontamination Composition H

In a 250 mL glass jar, mix 4 grams of cerium(III) oxalate hydrate hexahydrate and 100 mL of distilled water. The solids are mixed using a magnetic stirrer to produce the decontamination composition H.

Example 9

Preparation of Decontamination Composition I

In a 250 mL glass jar, mix 4 grams of cerium(III) sulfate hydrate and 100 mL of distilled water. The solids are mixed using a magnetic stirrer to produce the decontamination composition I.

Example 10

Decontamination of PAH's Using Decontamination Composition A

One square inch of poly(benzimidazole) based test fabric was challenged (applying the contaminant to a substrate) with 315 micrograms of Benzo(a)pyrene, B(a)P. B(a)P is one of the concerning PAHs which can be present on the firefighter ensemble. The decontamination solution A obtained from example 1 was sprayed onto B(a)p challenged test fabrics such that the quantity of cerium added to the fabric was between 7.5 and 10.6 mg/in$^2$ (milligrams per square inch). After 15 minutes, the fabric was extracted with acetonitrile solvent. The extracted solution was analyzed for the presence of B(a)P using High Performance Liquid Chromatography (HPLC) with a UV-VIS detector. There was no B(a)P left in the extraction solution, suggesting that B(a)P was 100% decontaminated.

Example 10a (Control)

Decontamination of PAH's Using Water

One square inch of poly(benzimidazole) based test fabric was challenged with 315 micrograms of B(a)P. Water was sprayed onto B(a)p challenged test fabrics, and, after 15 minutes, the fabric was extracted with acetonitrile solvent. The extracted solution was analyzed for the presence of B(a)P using HPLC with a UV-VIS detector. More than 250 micrograms of B(a)P remained in the extraction solution, suggesting that less than 20% of the B(a)P was removed or converted.

Example 11

Decontamination of PAH's Using Decontamination Composition A

One square inch of poly(benzimidazole) based test fabric was challenged with 300 micrograms of B(a)P. The B(a)P challenged test fabric was placed in a beaker containing 50 mL of the decontamination solution A obtained from example 1. After 5 minutes of exposure, the fabric was removed and extracted with acetonitrile solvent. The extracted solution was analyzed for the presence of B(a)P using HPLC with a UV-VIS detector. There was no B(a)P left in the extraction solution, suggesting that B(a)P was 100% decontaminated.

Example 11a (Control)

Decontamination of PAH's Using Water

One square inch of poly(benzimidazole) based test fabric was challenged with 300 micrograms of B(a)P. The B(a)P challenged test fabric was placed in a beaker containing 50 mL water. After 5 minutes of exposure, the fabric was removed and extracted with acetonitrile solvent. The extracted solution was analyzed for the presence of B(a)P using HPLC with a UV-VIS detector. More than 240 micrograms of B(a)P remained in the extraction solution, suggesting that 20% or less of the B(a)P was removed or converted.

Example 12

Decontamination of PAH's Using Decontamination Composition 1A

One square inch of poly(benzimidazole) based test fabric was challenged with 500 nanograms each of four major PAH's: Benzo(a)pyrene (B(a)P), Benzo(a)anthracene (B(a)A), Benzo(b)fluoranthene (B(b)F), Dibenz(a,h)anthracene (D(a,h)A). 1 mL of the decontamination solution 1A obtained from Example 1a was added in drops to the test fabrics which were previously challenged with the combined PAH's. After specified exposure times as shown below, the fabric was extracted with 1:1 (by volume) of acetone: methylene chloride solution. The extracted solution was analyzed for the presence of the four PAH's using Gas Chromatography coupled with Mass Spectroscopy (GC/MS). The decontamination efficiency with respect to time for the PAH's is shown in the following table:

| PAH type | Amount of PAH decontaminated (%) at specified time (min) | | | | |
| --- | --- | --- | --- | --- | --- |
|  | 1 | 5 | 10 | 20 | 30 |
| B(a)P | 70 ± 10 | 100 ± 2 | 95 ± 5 | 100 ± 2 | 100 ± 2 |
| B(a)A | 40 ± 10 | 45 ± 5 | 50 ± 10 | 50 ± 2 | 50 ± 5 |
| B(b)F | 38 ± 15 | 38 ± 10 | 45 ± 5 | 35 ± 8 | 32 ± 10 |
| D(a, h)A | 25 ± 15 | 50 ± 10 | 35 ± 10 | 38 ± 10 | 30 ± 5 |

Example 13

Example of On-Scene Decontamination Method at the Scene of a Fire Incident

After the rescue operation is complete, proceed for decontamination. Use a previously made decontamination composition 1A, or prepare a solution according to the procedure on the scene by adding packet of concentrate (liquid or powder) into sprayer and adding water up to fill line. Mix until dissolved. Pressurize sprayer with hand pump. Optional—Connect garden hose (with spray nozzle) to pump with adapter on engine. Optional—Spray down firefighter with clean water, removing loose soot from SCBA, jacket, trousers, gloves, and boots. Rinse helmet separately. Spray firefighter with decontamination solution, making sure to fully cover/saturate all turnout gear, including hood. Spray helmet separately, inside and out. After all visible soot has come in contact with decontamination solution, firefighter will remove Self-contained Breathing Apparatus (SCBA). Additional solution may be sprayed on areas that were covered with SCBA bottle and straps. Spray SCBA completely, including the seal of the mask. Pour out any remaining decontamination solution and rinse sprayer with clean water. Return to station, remove turnout gear, and shower. Wash turnout gear before wearing again in accordance with NFPA 1851 or standard AATCC method.

Example 14

On-Scene Decontamination of PAH's Using the Decontamination Composition 1A Immediately from the Firefighter's Ensemble After a Rescue Mission on the Scene of a Fire Incident After the rescue operation is complete, the firefighter will proceed to a mobile shower unit, wherein the shower unit comprises of shower heads capable of spraying the decontamination composition 1A and municipal water in tandem for a specified amount of time as soon as the firefighter steps into the shower. The shower booth is capable of indicating the firefighter whether the decontamination is complete by flashing a green light. The shower booth is further capable of collecting the run off solution in isolated tank for reuse or safe discharge. Once the decontamination process is complete, the firefighter can safely remove the ensemble and return to station.

Example 15

Off-Site Decontamination of PAH's Using the Decontamination Solution 1A from the Firefighter's Ensemble Collected and Stored After the Rescue Mission After the rescue operation is complete, remove the ensemble and store in a 55-gallon (gal) drum liner. Add 2 gal of the decontamination composition 1A prepared from Example 1 to the contaminated ensemble and wait for couple of hours. The ensemble is then transferred to another 55-gal drum liner containing water, and the ensemble is thoroughly rinsed and removed. The decontaminated ensemble is further cleaned in accordance with NFPA 1851 or standard AATCC method.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A decontamination composition comprising:
   an aqueous solution of a water soluble cerium salt or a dispersion of cerium oxide in water;
   an oxidizer comprising hydrogen peroxide, sodium hypochlorite, sodium percarbonate, or combinations thereof; and
   an activator for the oxidizer when the oxidizer is hydrogen peroxide or sodium hypochlorite, or an optional activator when the oxidizer is sodium percarbonate;
   wherein a concentration of cerium ions in the decontamination composition is in a range from 1 to 500 ppm.

2. The composition of claim 1 further comprising at least one of a surfactant, a co-solvent, a chelating agent, and a polymer.

3. The composition of claim 1 wherein the composition comprises the activator for the oxidizer and wherein the activator comprises tetraacetoxy ethylene diamine (TAED), sodium nonanoyloxybenzenesulfonate, silver acetate, silver nitrate, manganese acetate, copper acetate, iron (II) sulfate, iron (III) sulfate, or combinations thereof.

4. The composition of claim 2 wherein the composition comprises the surfactant and wherein the surfactant comprises a cationic surfactant, an anionic surfactant, a nonionic surfactant, or combinations thereof.

5. The composition of claim 2 wherein the composition comprises the surfactant and wherein the surfactant comprises a poly(ethylene oxide-b-propylene oxide), a poly (ethylene oxide-b-butylene oxide), a sorbitol ester of a fatty acid, an ethoxylated fatty alcohol, sodium dodecyl sulfate, sodium lauryl benzene sulfonate, a poly acrylic acid, a sulfate based surfactant, a sulfonate based surfactant, a benzalkonium salt, a polyquaternium, a poly(vinyl pyridine) co-N,N dimethyl ethyl methacrylate, or combinations thereof.

6. The composition of claim 2 wherein the composition comprises the co-solvent and wherein the co-solvent comprises ethanol, glycerol, propylene glycol, propylene glycol ethyl ether, ethylene carbonate, propylene carbonate, or combinations thereof.

7. The composition of claim 2 wherein the composition comprises the chelating agent and wherein the chelating agent comprises citric acid, ethylene diamine tetraacetic acid, or combinations thereof.

8. The composition of claim 2 wherein the composition comprises the polymer and wherein the polymer comprises a polyacrylic acid, a poly (acrylic acid-co-methyl vinyl ether), a polyvinyl pyrrolidone, a polyvinyl pyridine, a polyoxazolidone and a polyoxazolidone copolymer, or combinations thereof.

9. The composition of claim 1 wherein the composition comprises an aqueous solution comprising 1 to 10 wt % oxidizer, 0.01 to 10 wt % activator, 0 to 2 wt % surfactant, 0 to 30 wt % co-solvent, 0 to 1 wt % chelating agent, and 0 to 5 wt % polymer.

10. The composition of claim 1 wherein the cerium salt comprises ammonium cerium (IV) nitrate, ammonium cerium(IV) sulfate hydrate, cerium(III) carbonate hydrate, cerium(III) chloride heptahydrate, cerium(IV) fluoride, cerium(IV) hydroxide, cerium(IV) nitrate hexahydrate, cerium (III) sulfate hydrate, or combinations thereof.

11. A decontamination composition consisting essentially of;
   an aqueous solution of a water soluble cerium salt;
   an oxidizer comprising hydrogen peroxide, sodium hypochlorite, sodium percarbonate, or combinations thereof;
   an activator for the oxidizer; and
   at least one of a surfactant, a co-solvent, a chelating agent, and a polymer.

12. The composition of claim 11 wherein the composition comprises 1 to 500 ppm cerium salt, 1 to 10 wt % oxidizer, 0.01 to 10 wt % activator, 0 to 2 wt % surfactant, 0 to 30 wt % co-solvent, 0 to 1 wt % chelating agent, and 0 to 5 wt % polymer, and wherein the amount of at least one of the surfactant, the co-solvent, the chelating agent, or the polymer is greater than 0.

13. A method of decontaminating clothing comprising:
   applying a decontamination composition to clothing containing toxic materials, PAH, or both, the decontamination composition comprising an aqueous solution of a water soluble cerium salt or a dispersion of cerium oxide in water;

an oxidizer comprising hydrogen peroxide, sodium hypochlorite, sodium percarbonate, or combinations thereof; and an activator for the oxidizer when the oxidizer is hydrogen peroxide or sodium hypochlorite or an optional activator when the oxidizer is sodium percarbonate;

wherein a concentration of cerium ions in the decontamination composition is in a range from 1 to 500 ppm.

14. The method of claim 13 wherein at least 50% of the toxic materials, PAH, or both are removed or converted to a less toxic material or a benign material or both.

15. The method of claim 13 wherein the method of applying the decontamination composition comprises spraying, dipping, pouring, wiping, scrubbing, or combinations thereof.

16. The method of claim 13 wherein at least 90% of the toxic materials, PAH, or both are removed or converted to a less toxic or benign material or both.

17. The method of claim 13 wherein the decontamination composition is applied at a temperature in a range of 4° C. to 30° C.

18. The method of claim 13 further comprising removing the decontamination composition from the clothing after decontamination.

19. The composition of claim 1 wherein the composition consists essentially of the aqueous solution of the water soluble cerium salt or the dispersion of cerium oxide in water; the oxidizer; the activator; and at least one of a surfactant, a co-solvent, a chelating agent, and a polymer.

* * * * *